(12) United States Patent
Ahn et al.

(10) Patent No.: US 8,501,887 B2
(45) Date of Patent: Aug. 6, 2013

(54) RADICAL POLYMERIZABLE COMPOSITION

(75) Inventors: Dongchan Ahn, Midland, MI (US); Gang Lu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 141 days.

(21) Appl. No.: 13/056,199

(22) PCT Filed: Jul. 27, 2009

(86) PCT No.: PCT/US2009/051829
§ 371 (c)(1),
(2), (4) Date: Jan. 27, 2011

(87) PCT Pub. No.: WO2010/014537
PCT Pub. Date: Feb. 4, 2010

(65) Prior Publication Data
US 2011/0129683 A1     Jun. 2, 2011

Related U.S. Application Data

(60) Provisional application No. 61/084,173, filed on Jul. 28, 2008.

(51) Int. Cl.
*C07D 233/56*     (2006.01)
*C07D 235/08*     (2006.01)

(52) U.S. Cl.
USPC ........... 526/217; 526/194; 526/195; 526/196; 526/197; 526/204; 526/236; 526/279; 526/321; 526/328; 528/4; 528/5; 528/7; 528/8; 528/394; 528/423; 548/110; 548/304.4; 548/335.1

(58) Field of Classification Search
None
See application file for complete search history.

(56) References Cited

U.S. PATENT DOCUMENTS

| 6,706,831 B2 | 3/2004 | Sonnenschein et al. | |
| 6,777,512 B1 * | 8/2004 | Sonnenschein et al. | 526/196 |
| 7,247,596 B2 | 7/2007 | Jialanella et al. | |
| 2007/0079931 A1 | 4/2007 | Feng et al. | |
| 2007/0083051 A1 * | 4/2007 | Feng et al. | 548/110 |
| 2007/0141267 A1 | 6/2007 | Sonnenschein et al. | |

FOREIGN PATENT DOCUMENTS

| JP | 2000297118 A * | 10/2000 |
| WO | WO 0132717 A2 | 5/2001 |
| WO | WO 0144311 A1 | 6/2001 |
| WO | WO 2006049792 A1 | 5/2006 |
| WO | WO 2007044735 A2 | 4/2007 |

OTHER PUBLICATIONS

Noeth, Journal of Magnetic Resonance 1986, 69(3), 492-495.*
Oleg Stenzel, Helgard G. Raubenheimer, and Catharine Esterhuysen, "Biphasic hydroformylation in new molten salts-analogies and differences to organic solvents", Journal of the Chemical Society, Dalton Transactions 2002, 6, 1132-1138.*
Matsumi et al., "Liquid imidazole-borane complex," Chem. Commun., 2005, pp. 4557-4559.
Wacker et al., "Borane-Substituted Imidazol-2-ylidenes: Syntheses, Structures, and Reactivity," European Journal of Inorganic Chemistry, 1998, pp. 843-849.
Matteson et al., "Glass-Catalyzed Conversion of Boronic Esters of Asymmetric Diols to Diol Sulfites and Amine Complexes of Boron Halides," Organometallics, 2001, 20, pp. 2920-2923.
Koster et al., "Tetraalkyldiboranes and 9-Borabicyclo [3.3.1] Nonane Dimer," Inorganic Synthesis, 1974, vol. 15, pp. 141-149.
Sonnenschein et al., "Physical and Chemical Probes of the Bond Strength between Trialkylboranes and Amines and Their Utility as Stabilized Free Radical Polymerization Catalysts," Macromolecules, 2006, 39, pp. 2507-2513.
Kuniharu et al., "Polymer Letters," Department of Applied Chemistry, 1970, vol. 8, pp. 541-547, Japan.
Alam et al., "Boron-Nitrogen Compounds," Journal of Organometallic Chemistry, 1983, 243, pp. 19-30, The Netherlands.
Langer et al., "Reactivity and Catalytic Asymmetric Addition to Aldehydes," Org. Chem., 1996, 61, pp. 8229-8243, Germany.
International Search Report for Application No. PCT/US2009/051829 dated Oct. 28, 2009, 4 pages.

* cited by examiner

*Primary Examiner* — Richard A Huhn
(74) *Attorney, Agent, or Firm* — Howard & Howard Attorneys PLLC

(57) ABSTRACT

A radical polymerizable composition includes a radical polymerizable compound and an organoborane-azole complex. The organoborane-azole complex includes an azole having at least two nitrogen atoms wherein at least one nitrogen atom is an $sp^3$ nitrogen atom and is substituted. A method of forming the composition includes the step of combining the radical polymerizable compound and the organoborane-azole complex to form the composition. The method also includes the step of polymerizing the composition. A composite article which includes a substrate and a cured composition disposed on the substrate is also provided. The cured composition is formed from polymerization of the composition.

21 Claims, No Drawings

RADICAL POLYMERIZABLE COMPOSITION

RELATED APPLICATIONS

This application claims priority to and all the advantages of International Patent Application No. PCT/US2009/051829, filed on Jul. 27, 2009, which claims priority to U.S. Provisional Patent Application No. 60/084,173, filed on Jul. 28, 2008.

FIELD OF THE INVENTION

The present invention relates to a radical polymerizable composition. More specifically, the radical polymerizable composition includes a radical polymerizable compound and an organoborane-azole complex including a substituted azole. The present invention also relates to a method of forming the radical polymerizable composition.

DESCRIPTION OF THE RELATED ART

Countless radical polymerizable compositions are known in the art and have been investigated for use in many industrial processes. Radical polymerization is a widely used process for production of a range of plastic goods due to its versatility and robustness. Radical polymerization is typically used to produce large commodity and specialty plastics including polystyrene and polymethylmethacrylate and also to produce adhesives, sealants, inks, paints, coatings, and composite articles.

Conventional radical polymerization systems are typically azo-based or peroxide-based and utilize azobisisobutyronitrile and benzoyl peroxide, respectively. These systems can be activated using heat or ultraviolet (UV) radiation. In heat activated systems, high temperatures are employed and reaction times typically average greater than 12 hours thereby raising production costs and times and increasing energy expenditure. If these high temperatures are not used, limited storage stability of the radical polymerizable compositions at ambient temperatures can result. Also, the peroxide-based systems are easily inhibited in the presence of atmospheric oxygen leading to uncured or poorly cured products having wet surfaces. Undesirable decomposition by-products may also be generated. Thus, these types of systems typically require use of an inert (oxygen-free) atmosphere, thereby further raising production costs and complexities.

In UV radiation activated systems, costly photoinitiators are typically used which also raises production costs and times and increases energy expenditure. Additionally, UV radiation systems are not preferred for use in bulk polymerizations where UV transmission is limited.

One specific means of curing compositions using radical polymerization includes use of boron compounds, e.g. with an organo-functional boron compound. Organoboron compounds initiate free radical polymerization and promote adhesion to low surface energy substrates due to an ability to generate radicals to polymerize radical polymerizable compounds. However, oxidation of organoboron compounds with molecular oxygen forms energetic peroxides which are exothermic and can be pyrophoric if not carefully controlled. Due to this reactivity, the organoboron compounds have been stabilized with blocking agents that dissociate under controlled conditions to release the organoboron compounds and initiate free radical formation. The blocking agents render the organoboron compounds less susceptible to oxygen insertion and radical initiation.

One type of blocking agent includes amines which, when reacted with the organoboron compounds, form organoborane-amine complexes. Although functional, the organoborane-amine complexes are not stable for extended periods in acrylate functional monomer solutions, such as those commonly used in adhesives. If used in these types of monomer solutions, the amine portion of the organoborane-amine complexes typically reacts at room temperature, via Michael addition reactions, with acrylic monomers or with other impurities to prematurely initiate polymerization. This reduces shelf life and minimizes the efficiency, predictability, and reproducibility of polymerization reactions.

One particular reference that focuses on boron technology, WO 01/44311 to Sonnenschein, et al., discloses borane-imidazoline complexes that include "imine" bonds. As is known in the art, imidazoline complexes that include "imine" bonds are not aromatic and are quite different than imidazole complexes which have at least two double bonds and are aromatic. In a typographical error that appears at least on page 29 (Table 1, Example 65), Sonnenschein discloses "2-methyl-2-imidazole." This compound cannot exist. Instead, this name is presumably referring to "2-methyl-2-imidazoline" which only has a single carbon-nitrogen double bond. In a subsequent U.S. Pat. No. 6,706,831, this error is corrected to read "2-methyl-2-imidazoline in Table 1, Example 65.

Additionally, the '831 patent discloses a pyrazole complex with TBB and an imidazole complex, both of which are predicted to be unstable or marginally unstable based upon theoretical binding energy calculations of 10.2 and 11.1 kcal/mol, respectively. Both of these calculations are near the stability threshold of 11. Further, the '831 patent discloses an organoborane amine complex with an aminofunctional azole (3-amino pyrazole) which is calculated to have a theoretical binding energy of 13.2 kcal/mol, suggesting that its stability is enhanced by a primary amino group. However, when this type of azole is used with certain monomers, such as acrylic monomers, unfavorable Michael additions may occur thereby leading to poor results.

Further, the '831 patent discloses that, in certain industrial processes, such as those involving low surface energy olefins such as polyethylene, polypropylene, and polytetrafluoroethylene, it is difficult to develop adhesive compositions that exhibit adequate bonding strength. Typical commercially available adhesives that are used for these materials require time consuming or expensive pre-treatment steps such as corona treatment, flame treatment, application of primers, and the like. These pre-treatment steps result in increased production costs, times, and complexity.

Therefore, there remains an opportunity to form a polymerizable composition that includes components that are chemically stable in monomer solutions such as acrylate functional monomer solutions and that do not readily react with amines or impurities at room temperature, but can be activated rapidly by deblocking to initiate polymerization when desired. There are also remains an opportunity to form a polymerizable composition that can be polymerized efficiently, predictably, and reproducibly.

SUMMARY OF THE INVENTION AND ADVANTAGES

The present invention provides a radical polymerizable composition that includes a radical polymerizable compound and an organoborane-azole complex. The organoborane-azole complex includes an azole having at least two nitrogen atoms wherein at least one of the nitrogen atoms is an $sp^3$ nitrogen atom and is substituted. The present invention also provides a method of forming the radical polymerizable composition. The method includes the step of combining the radical polymerizable compound and the organoborane-azole complex to form the radical polymerizable composition. The method also includes the step of polymerizing the radical polymerizable composition. The present invention also provides a composite article including a substrate and a cured composition disposed on the substrate. The cured composition is formed from polymerization of the radical polymerizable composition.

The organoborane-azole complex is chemically stable both in air and in monomer solutions such as acrylate functional monomer solutions and does not readily react with acrylic monomers or reaction impurities at room temperature via Michael additions. This stability reduces a chance that premature polymerization of the composition will occur, thereby increasing shelf life. This stability also allows for more efficient, predictable, and reproducible polymerization reactions to be used to form cured compositions and form composite articles.

The at least one $sp^3$ nitrogen atom of the azole is substituted to reduce a nucleophilicity of the azole and further reduce a chance that the azole will react via Michael addition. The substitution of the at least one $sp^3$ nitrogen atom reduces a chance that the azole will polymerize with borane and form a stable molecule that will not dissociate to initiate polymerization of the radical polymerizable compound. In addition, the substitution of the at least one $sp^3$ nitrogen atom maximizes the probability of obtaining a monomeric product.

DETAILED DESCRIPTION OF THE INVENTION

The present invention provides a radical polymerizable composition and a method of forming the composition. The present invention also provides a composite article including a cured composition formed from the radical polymerizable composition. The invention further provides a method of forming the composite article.

The radical polymerizable composition, hereafter referred to as "composition", may be used in any industry. The composition may be used in a variety of applications and in composite articles, including, but not limited to, polymeric or copolymeric additives, molded articles, inks, rubbers, tapes, adhesives, protective coatings, films, encapsulants, gels, electronic components, photonic components, acoustic dampening components, thermoplastic articles, thermoset articles, sealants, foams, gaskets, seals, o-rings, connectors, pressure sensitive adhesives, paper coatings, self-adherent silicone elastomers and gels, die attachment adhesives, lid sealants, encapsulants, gaskets, o-rings, potting compounds, release coatings, conformal coatings, integrally bonded parts such as connectors and housings for electrical wiring or electronic circuits, diving masks for scuba diving, and combinations thereof. The composition may also be used in silicone elastomers which are capable of releasing from metal molds while at the same time adhering selectively to polymeric surfaces. These silicone elastomers can be co-molded or over-molded with polymeric resins in forming. The composition may also have physical properties that range from those consistent with gels to those consistent with rigid resins.

The composition includes a radical polymerizable compound and an organoborane-azole complex. The radical polymerizable compound may be any known in the art. In one embodiment, the composition may include more than one radical polymerizable compound. The radical polymerizable compound may be selected from the group of monomers, dimers, oligomers, pre-polymers, polymers, co-polymers, block polymers, star polymers, graft polymers, random co-polymers, and combinations thereof. These combinations may be used to impart a desired combination of bulk and surface properties such as cure rate, modulus, and adhesion, to the composition. In another embodiment, the radical polymerizable compound includes a silicon compound and an organic compound.

In yet another embodiment, the radical polymerizable compound is substantially free of silicon atoms (Si). That is, in one embodiment, the composition is substantially free of radical polymerizable compounds that include one or more silicon (Si) atoms. It is to be understood that the terminology "substantially free" refers to a concentration of less than 5,000, more typically of less than 900, and most typically of less than 100, parts of compounds that include one or more silicon atoms, per one million parts of the composition.

The radical polymerizable compound may be selected from the group of acrylates, halogen substituted acrylates, alkenoates, carbonates, phthalates, acetates, itaconates, and combinations thereof. Suitable examples of acrylates include, but are not limited to, butyleneglycol diacrylate, butylene glycol dimethylacrylate, 2-ethylhexylacrylate, 2-ethylhexylmethacrylate, 2-hydroxyethylacrylate, 2 hydroxyethyl methacrylate, methylacrylate, methylmethacrylate, neopentylglycol diacrylate, neopentylglycoldimethacrylate, glycidyl acrylate, glycidyl methacrylate, allyl acrylate, allyl methacrylate, stearyl acrylate, stearyl methacrylate, tetrahydrofurfuryl acrylate, tetrahydrofurfuryl methacrylate, caprolactone acrylate, perfluorobutyl acrylate, perfluorobutyl methacrylate, 1H, 1H, 2H, 2H-heptadecafluorodecyl acrylate, 1H, 1H, 2H, 2H-heptadecafluorodecyl methacrylate, tetrahydroperfluoroacrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethyleneglycol diacrylate, diethyleneglycol dimethacrylate, dipropyleneglycol diacrylate, dipropyleneglycol dimethacrylate, polyethyleneglycol diacrylate, polyethyleneglycol dimethacrylate, polypropyleneglycol diacrylate, polypropyleneglycol dimethacrylate, trimethylolpropanetriacrylate, trimethylolpropanetrimethacrylate, ethoxylated trimethylolpropanetriacrylate, ethoxylated trimethylolpropanetrimethacrylate, pentaerythritol triacrylate, pentaerythritol trimethacrylate, pentaerythritol tetraacrylate, pentaerythritol tetramethacrylate, and combinations thereof. Other examples of suitable acrylates include acrylamides and methacrylamides such as N-isopropyl acrylamide and N,N-dimethylacrylamide. Suitable examples of alkenoates include, but are not limited to, alkyl-N-alkenoates, methyl-3-butenoate, and combinations thereof. In one embodiment, the radical polymerizable compound is selected from the group of alkylene glycol dialkylacrylate, alkylene glycol diacrylate, and combinations thereof.

Suitable examples of carbonates include, but are not limited to, alkyl carbonates, allyl alkyl carbonates such as allyl methyl carbonate, diallyl pyrocarbonate, diallyl carbonate, and combinations thereof. Suitable itaconates for use in the present invention include, but are not limited to, alkyl itaconates such as dimethyl itaconate. Non-limiting examples of suitable acetates include alkyl acetates, allyl acetates, allyl acetoacetates, and combinations thereof. Non-limiting of examples of phthalates include, but are not limited to, allyl phthalates, diallyl phthalates, and combinations thereof.

The radical polymerizable compound may also include styrene and substituted styrenes, particularly when used in conjunction with acrylic monomers. The radical polymerizable compound may alternatively include acrylate tipped polyurethane prepolymers prepared by reacting isocyanate reactive acrylate monomers, oligomers or polymers, such as hydroxy acrylates, with isocyanate functional prepolymers. Also useful are a class of conductive monomers, dopants, oligomers, polymers, and macromonomers having an average of at least one free radical polymerizable group per molecule, and the ability to transport electrons, ions, holes, and/or phonons. Non-limiting examples include, but are not limited to, 4,4'4"-tris[N-(3(2-acryloyloxyethyloxy)phenyl)-N-phenylamino]triphenylamine, and 4,4'4"-tris[N-(3(benzoyloxyphenyl)-N-phenylamino]triphenylamine.

It is also contemplated that the radical polymerizable compound may include compounds including acryloxyalkyl groups such as an acryloxypropyl group, methacryloxyalkyl groups such as a methacryloxypropyl group, and/or unsaturated organic groups including, but not limited to, alkenyl groups having 2-12 carbon atoms including vinyl, allyl, butenyl, and hexenyl groups, alkynyl groups having 2-12 carbon atoms including ethynyl, propynyl, and butynyl groups, and combinations thereof. The unsaturated organic groups may include radical polymerizable groups in oligomeric and/or polymeric polyethers including an allyloxypoly(oxyalkylene) group, halogen substituted analogs thereof, and combinations thereof. In another embodiment, the radical polymerizable compound includes a compound formed by copolymerizing organic compounds having polymeric backbones with the radical polymerizable compound such that there is an average of at least one free radical polymerizable group per copolymer. Suitable organic compounds include, but are not limited to, hydrocarbon based polymers such as polyisobutylene, polybutadienes, polyisoprenes, polyolefins such as polyethylene, polypropylene and polyethylene polypropylene copolymers, polystyrenes, styrene butadiene, and acrylonitrile butadiene styrene, polyacrylates, polyethers such as polyethylene oxide and polypropyleneoxide, polyesters such as polyethylene terephthalate and polybutylene terephthalate, polyamides, polycarbonates, polyimides, polyureas, polymethacrylates, partially fluorinated or perfluorinated polymers such as polytetrafluoroethylene, fluorinated rubbers, terminally unsaturated hydrocarbons, olefins, polyolefins, and combinations thereof. The organic compounds can also include a copolymer including polymers having multiple organic functionality, multiple organopolysiloxane functionality, and combinations of organopolysiloxanes with the organic compounds. The copolymer may include repeating units in a random, grafted, or blocked arrangement.

Alternatively, the composition may be substantially free of radical polymerizable compounds that do not include one or more silicon atoms, which may include those compounds described above. It is to be understood that the terminology "substantially free" refers to a concentration of less than 5,000, more typically of less than 900, and most typically of less than 100, parts of compounds that do not include one or more silicon atoms, per one million parts of the composition.

In one embodiment, the radical polymerizable compound includes silicon atoms. In another embodiment, the radical polymerizable compound is selected from the group of an organosilane, an organopolysiloxane, and combinations thereof. In yet another embodiment, the radical polymerizable compound consists essentially of compounds including silicon atoms. The radical polymerizable compound may include compounds selected from the group of silanes, siloxanes, polymers thereof, organic derivatives thereof, and combinations thereof. For example, these compounds may include acryloxyalkyl- and methacryloxyalkyl-functional silanes, acryloxyalkyl- and methacryloxyalkyl-functional organopolysiloxanes, and combinations thereof. It is to be understood that acryloxyalkyl, for purposes of the present invention, is equivalent to acryloyloxyalkyl. These compounds may also have an average of at least one, or at least two, free radical polymerizable groups and an average of 0.1 to 50 mole percent of the free radical polymerizable groups including unsaturated organic moieties. The unsaturated organic groups may include, but are not limited to, alkenyl groups, alkynyl groups, acrylate-functional groups, methacrylate functional groups, and combinations thereof. "Mole percent" of the unsaturated organic groups is defined as a ratio of a number of moles of unsaturated organic groups including siloxane moieties in these compounds to a total number of moles of siloxane moieties in the radical polymerizable compound, multiplied by 100.

The radical polymerizable compound may also include compounds including a functional group incorporated in the free radical polymerizable group. These compounds may be monofunctional or multifunctional with respect to the functional group and may allow for polymerization of the radical polymerizable compound to linear polymers, branched polymers, copolymers, cross-linked polymers, and combinations thereof. The functional group may include any known in the art used in addition and/or condensation polymerizable compositions.

Alternatively, the radical polymerizable compound may include an organosilane having the general structure:

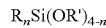

$$R_nSi(OR')_{4-n}$$

wherein n is an integer of less than or equal to 4 and wherein at least one of R and R' independently includes the free radical polymerizable group. In one embodiment, if only one of the R and/or R' includes the free radical polymerizable group, the other may include a monovalent organic group free of aliphatic unsaturation. The R and/or R' may each independently include one of a hydrogen, a halogen atom, and an organic group including, but not limited to, alkyl groups, haloalkyl groups, aryl groups, haloaryl groups, alkenyl groups, alkynyl groups, acrylate and methacrylate groups. The R and/or R' may also each independently include other organic functional groups including, but not limited to, glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, hydroxyl groups, and combinations thereof. The monovalent organic group typically has from 1 to 20 and more typically from 1 to 10, carbon atoms. The monovalent organic group may include alkyl groups including, but not limited to, methyl, ethyl, propyl, pentyl, octyl, undecyl, octadecyl groups, and combinations thereof. The monovalent organic group may also include cycloalkyl groups including, but not limited to, a cyclohexyl group. The monovalent organic group may further include aryl groups including, but not limited to, phenyl, tolyl, xylyl, benzyl, 2-phenylethyl groups, and combinations thereof. The monovalent organic group may still further include an alkyloxypoly(oxylalkylene) group including, but not limited to, propyloxypoly(oxyethylene), propyloxypoly(oxypropylene), propyloxy-poly(oxypropylene)-co-poly(oxyethylene), halogen substituted versions thereof, and combinations thereof. Additionally, the monovalent organic group may include a cyanofunctional group including, but not limited to, a cyanoalkyl group including a cyanoethyl group, a cyanopropyl group, and combinations thereof. The monovalent organic group may also include a halogenated hydrocarbon group including, but not limited to, 3,3,3-trifluoropropyl, 3-chloropropyl, dichlorophenyl, and 6,6,6,5,5,4,4,3,3-nonafluorohexyl groups, and combinations thereof. The monovalent organic group may still further include carbazole groups such as 3-(N-carbazolyl)propyl, arylamino-functional groups such as 4-(N,N-diphenylamino)phenyl-3-propyl, and halogenated hydrocarbon groups such as 3,3,3-trifluoropropyl, 3-chloropropyl, dichlorophenyl, and 6,6,6,5,5,4,4,3,3-nonafluorohexyl. Typically, the radical polymerizable group includes an aliphatic unsaturated group in which at least one double bond is located at a terminal position, an internal position, or at both the terminal and the internal positions. More typically, the radical polymerizable group includes acrylate groups, methacrylate groups, and combinations thereof.

Alternatively, the radical polymerizable compound may include, but is not limited to methacryloxypropyldiethylsiloxy terminated polydimethylsiloxane, 3-methacryloxypropyl trimethoxysilane, methacryloxymethyltrimethoxysilane, 3-methacryloxypropyltriethoxysilane, 3-acryloxypropyltrimethoxysilane, acryloxymethyltrimethoxysilane, 3-methacryloxypropyltrimethylsilane, 3-methacryloxypropyldimethylmonomethoxysilane, 3-methacryloxypropylmethyldimethoxysilane, 3-acryloxypropyltriethoxysilane, 3-acryloxypropyldimethylmonomethoxysilane, 3-acryloxylpropyltrimethylsilane, vinyltrimethoxysilane, allyltrimethoxysilane, 1-hexenyltrimethoxysilane, tetra-(allyloxysilane), tetra-(3-butenyl-1-oxy)silane, tri-(3-butenyl-1-oxy)methylsilane, di-(3-butenyl-1-oxy)dimethylsilane, 3-butenyl-1-oxy trimethylsilane, and/or combinations thereof.

In one embodiment of the present invention, where the radical polymerizable compound includes an organopolysiloxane, the radical polymerizable compound may have a linear, branched, hyperbranched, or resinous structure. The radical polymerizable compound may also be homopolymeric or copolymeric. The radical polymerizable compound may include at least one of an acrylate group and a methacrylate group.

Alternatively, the radical polymerizable compound may include an acryloxyalkyl group such as an acryloxypropyl group, a methacryloxyalkyl group such as a methacryloxypropyl group, and/or an unsaturated organic group including, but not limited to, an alkenyl group having 2-12 carbon atoms including vinyl, allyl, butenyl, and hexenyl groups, alkynyl groups having 2-12 carbon atoms including ethynyl, propynyl, and butynyl groups, and combinations thereof. The unsaturated organic group may include the radical polymerizable group in oligomeric and/or polymeric polyethers including an allyloxypoly(oxyalkylene) group, halogen substituted analogs thereof, and combinations thereof.

Further, the radical polymerizable compound may be a liquid, a gum, or a solid, and may have any viscosity. If the radical polymerizable compound is a liquid, the viscosity may be equal to or greater than 0.001 Pa·s at 25° C. If the radical polymerizable compound is a gum or a solid, the resin or solid may become flowable at elevated temperatures or by application of shear.

The radical polymerizable compound may also include a compounding having at least one of the following formulae:

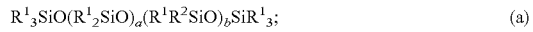  (a)

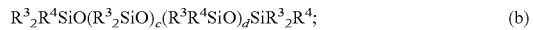  (b)

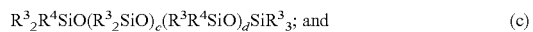  and (c)

combinations thereof. (d)

In Formula (a), a and b are integers and each typically has an average value of less than or equal to 20,000 and b typically has an average value of at least one. Also, $R^1$ typically includes a monovalent organic group. Suitable monovalent organic groups include, but are not limited to, acrylic functional groups such as acryloxymethyl, acryloxypropyl, methacryloxymethyl, and methacryloxypropyl groups, alkyl groups such as methyl, ethyl, propyl, and butyl groups, alkenyl groups such as vinyl, allyl, and butenyl groups, alkynyl groups such as ethynyl and propynyl groups, aromatic groups such as phenyl, tolyl, and xylyl groups, cyanoalkyl groups such as cyanoethyl and cyanopropyl groups, halogenated hydrocarbon groups such as 3,3,3-trifluoropropyl, 3-chloropropyl, dichlorophenyl, and 6,6,6,5,5,4,4,3,3-nonafluorohexyl groups, alkenyloxypoly(oxyalkyene) groups such as allyloxy(polyoxyethylene), allyloxypoly(oxypropylene), and allyloxy-poly(oxypropylene)-co-poly(oxyethylene) groups, alkyloxypoly(oxyalkyene) groups such as propyloxy(polyoxyethylene), propyloxypoly(oxypropylene), and propyloxy-poly(oxypropylene)-co-poly(oxyethylene) groups, halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups, alkoxy groups such as methoxy, ethoxy, n-propoxy, isopropoxy, n-butoxy, and ethylhexyloxy groups, aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups, epoxyalkyl groups such as 3-glycidoxypropyl, 2-(3,4,epoxycyclohexyl)ethyl, and 5,6-epoxyhexyl groups, ester functional groups such as acetoxymethyl and benzoyloxypropyl groups, hydroxyl functional groups such as hydroxy and 2-hydroxyethyl groups, isocyanate and masked isocyanate functional groups such as 3-isocyanatopropyl, tris-3-propylisocyanurate, propyl-t-butylcarbamate, and propylethylcarbamate groups, aldehyde functional groups such as undecanal and butyraldehyde groups, anhydride functional groups such as 3-propyl succinic anhydride, 2-ethyl succinic anhydride, methyl succinic anhydride, 3-propyl maleic anhydride, 2-ethyl maleic anhydride, methyl maleic anhydride, carboxylic acid functional groups such as 11-carboxyundecyl, 3-carboxypropyl and 2-carboxyethyl groups, carbazole groups such as 3-(N, N-diphenylamino)phenyl-3-propyl, arylamino-functional groups such as 4-(N,N-diphenylamino)phenyl-3-propyl, and metal salts of carboxylic acids such as the zinc, sodium, and/or potassium salts of 3-carboxypropyl and 2-carboxyethyl groups, and combinations thereof. $R^2$ typically includes an unsaturated monovalent organic group. The unsaturated monovalent organic group may include, but is not limited to, alkenyl groups such as vinyl, allyl, and butenyl groups, alkynyl groups such as ethynyl and propynyl groups, and acrylic functional groups such as acryloxypropyl and methacryloxypropyl groups, and combinations thereof.

In Formulae (b) and (c), c and d are integers and each typically has an average value of less than or equal to 20,000. In this formula, each $R^3$ may independently be the same or may be different from $R^1$. Additionally, each $R^4$ may independently include an unsaturated organic group including, but not limited to alkenyl groups such as vinyl, allyl, and butenyl groups, alkynyl groups such as ethynyl and propynyl groups, alkenyloxypoly(oxyalkyene) groups such as allyloxy(polyoxyethylene), allyloxypoly(oxypropylene), and allyloxy-poly(oxypropylene)-co-poly(oxyethylene) groups, acrylic functional groups such as acryloxypropyl and methacryloxypropyl groups, and combinations thereof.

In yet another embodiment, the radical polymerizable compound may include, but is not limited to, 1,3-bis(methacryloxypropyl)tetramethyldisiloxane, 1,3-bis(acryloxypropyl)tetramethyldisiloxane, 1,3-bis(methacryloxymethyl)tetramethyldisiloxane, 1,3-bis(acryloxymethyl)tetramethyldisiloxane, α,ω̄,-methacryloxymethyldimethylsilyl terminated polydimethylsiloxane, methacryloxypropyl-terminated polydimethylsiloxane, α,ω̄-acryloxymethyldimethylsilyl terminated polydimethylsiloxane, methacryloxypropyldimethylsilyl terminated polydimethylsiloxane, α,ω̄-acryloxypropyldimethylsilyl terminated polydimethylsiloxane, pendant acrylate and methacrylate functional polymers such as poly(acryloxypropyl-methylsiloxy)polydimethylsiloxane and poly(methacryloxypropyl-methylsiloxy) polydimethylsiloxane copolymers, telechelic polydimethylsiloxanes having multiple acrylate or methacrylate functional groups including those formed via a Michael addition reaction of multi-acrylate or multi-methacrylate monomers to amine terminated polydimethylsiloxanes, and combinations thereof. Other compounds suitable for use include, but are not limited to, monofunctional methacrylate or methacrylate terminated organopolysiloxanes such as polydimethylsiloxane terminated at one end by a methacryloxypropyldimethylsilyl group and terminated at another end by n-butyldimethylsilyl groups.

The radical polymerizable compound may include a mixture of liquids differing in degree of functionality and/or free radical polymerizable groups. For example, the radical polymerizable compound may include a tetra-functional telechelic polydimethylsiloxane prepared by a Michael addition reaction of precursors including a secondary amine terminated polydimethylsiloxane with two molar equivalents of trimethylolpropane tri-acrylate or with two molar equivalents of the reaction product of acryloxypropyltrimethoxysilane with three equivalents of a hydroxyfunctional methacrylate such as 2-hydroxyethylmethacrylate. Such liquids may also be formed in-situ by the use of the precursors, provided that the Michael addition is of similar reaction rate or faster than an organoborane-catalyzed curing reaction.

Further, the radical polymerizable compound may include organopolysiloxane resins having the following structures:

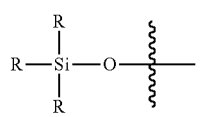

(M)

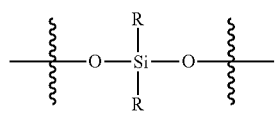

(D)

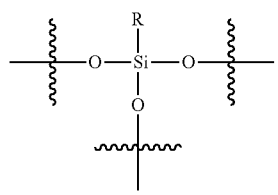

(T)

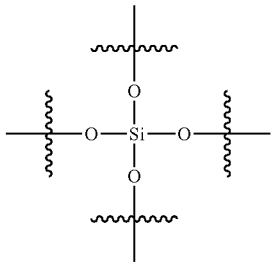

(Q)

wherein each of M, D, T, and Q independently represent functionality of structural groups of organopolysiloxanes. Specifically, M represents a monofunctional group $R_3SiO_{1/2}$. D represents a difunctional group $R_2SiO_{2/2}$. T represents a trifunctional group $RSiO_{3/2}$. Q represents a tetrafunctional group $SiO_{4/2}$.

If the radical polymerizable compound includes an organopolysiloxane resin, the organopolysiloxane resin may include MQ resins including $R^5_3SiO_{1/2}$ groups and $SiO_{4/2}$ groups, TD resins including $R^5SiO_{3/2}$ groups and $R^5_2SiO_{2/2}$ groups, MT resins including $R^5_3SiO_{1/2}$ groups and $R^5SiO_{3/2}$ groups, MTD resins including $R^5_3SiO_{1/2}$ groups, $R^5SiO_{3/2}$ groups, and $R^5_2SiO_{2/2}$ groups, and combinations thereof. Of course, the radical polymerizable compound could include other organopolysiloxane resins known in the art either alone or in combination with those described above.

In these resins, each $R^5$ includes a monovalent organic group. $R^5$ typically has from 1 to 20 and more typically has from 1 to 10, carbon atoms. Suitable examples of the monovalent organic groups include, but are not limited to, acrylate functional groups such as acryloxyalkyl groups, methacrylate functional groups such as methacryloxyalkyl groups, cyano-functional groups, and monovalent hydrocarbon groups, and combinations thereof. The monovalent hydrocarbon groups may include alkyl groups such as methyl, ethyl, propyl, pentyl, octyl, undecyl, and octadecyl groups, cycloalkyl groups such as cyclohexyl groups, alkenyl groups such as vinyl, allyl, butenyl, and hexenyl groups, alkynyl groups such as ethynyl, propynyl, and butynyl groups, aryl groups such as phenyl, tolyl, xylyl, benzyl, and 2-phenylethyl groups, halogenated hydrocarbon groups such as 3,3,3-trifluoropropyl, 3-chloropropyl, dichlorophenyl, and 6,6,6,5,5,4,4,3,3-nonafluorohexyl groups, and combinations thereof. The cyano-functional groups may include cyanoalkyl groups such as cyanoethyl and cyanopropyl groups, and combinations thereof.

$R^5$ may also include alkyloxypoly(oxyalkyene) groups such as propyloxy(polyoxyethylene), propyloxypoly(oxypropylene) and propyloxy-poly(oxypropylene)-co-poly(oxyethylene) groups, halogen substituted alkyloxypoly (oxyalkyene) groups such as perfluoropropyloxy (polyoxyethylene), perfluoropropyloxypoly(oxypropylene) and perfluoropropyloxy-poly(oxypropylene)copoly(oxyethylene) groups, alkenyloxypoly(oxyalkyene) groups such as allyloxypoly(oxyethylene), allyloxypoly(oxypropylene) and allyloxy-poly(oxypropylene)copoly(oxyethylene) groups, alkoxy groups such as methoxy, ethoxy, n-propoxy, isopropoxy, n-butoxy and ethylhexyloxy groups, aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups, hindered aminoalkyl groups such as tetramethylpiperidinyl oxypropyl groups, epoxyalkyl groups such as 3-glycidoxypropyl, 2-(3,4,-epoxycyclohexyl)ethyl, and 5,6-epoxyhexyl groups, ester functional groups such as acetoxymethyl and benzoyloxypropyl groups, hydroxyl functional groups such as hydroxy and 2-hydroxyethyl groups, isocyanate and masked isocyanate functional groups such as 3-isocyanatopropyl, tris-3propylisocyanurate, propyl-t-butylcarbamate, and propylethylcarbamate groups, aldehyde functional groups such as undecanal and butyraldehyde groups, anhydride functional groups such as 3-propyl succinic anhydride and 3-propyl maleic anhydride groups, carboxylic acid functional groups such as 3-carboxypropyl, 2-carboxyethyl, and 10-carboxydecyl groups, metal salts of carboxylic acids such as zinc, sodium, and potassium salts of 3-carboxypropyl and 2-carboxyethyl groups, and combinations thereof.

Some specific examples of suitable resins that are useful include, but are not limited to $M^{Methacryloxymethyl}Q$ resins, $M^{Methacryloxypropyl}Q$ resins, $MT^{Methacryloxymethyl}T$ resins, $MT^{Methacryloxypropyl}T$ resins, $MDT^{Methacryloxymethyl}T^{Phenyl}T$ resins, $MDT^{Methacryloxypropyl}T^{Phenyl}T$ resins, $M^{Vinyl}T^{Phenyl}$ resins, $TT^{Methacryloxymethyl}$ resins, $TT^{Methacryloxypropyl}$ resins, $T^{Phenyl}T^{Methacryloxymethyl}$ resins, $T^{Phenyl}M^{Methacryloxypropyl}$ resins, $TT^{Phenyl}T^{Methacryloxymethyl}$ resins, and $TT^{Phenyl}T^{Methacryloxypropyl}$ resins, and combinations thereof, where M, D, T, and Q are the same as described above. Alternatively, the radical polymerizable compound may include hybrid molecules, polymers, co-polymers, etc. of silicon and non-silicon based polymerizable compounds.

The organopolysiloxane resins may be prepared by any method known in the art. In one embodiment, the resin is made by treating a resin copolymer produced by a silica hydrosol capping process with an alkenyl including endblocking reagent. This typically includes reacting a silica hydrosol under acidic conditions with a hydrolyzable triorganosilane such as trimethylchlorosilane, a siloxane such as hexamethyldisiloxane, and combinations thereof, and then recovering a copolymer having M and Q groups including 2 to 5 percent by weight of hydroxyl groups. The copolymer is then typically reacted with an endblocking agent including unsaturated organic groups and an endblocking agent free of aliphatic unsaturation in amounts sufficient to provide 3 to 30 mole percent of unsaturated organic groups in the resin. Suitable endblocking agents include silazanes, siloxanes, silanes, and combinations thereof.

The radical polymerizable compound is typically present in an amount of from 5 to 95, more typically of from 10 to 95, even more typically of from 60 to 95, and most typically of from 90 to 97, parts by weight per 100 parts by weight of the composition, excluding non-essential additives such as fillers and/or solvents. It is also contemplated that one or more radical polymerizable compounds such as organic monomers, organopolysiloxane linear polymers, resins, and copolymers, may be combined to form the radical polymerizable compound to customize physical properties.

The radical polymerizable compound may include a physical transition temperature, include an organofunctional group with a physical transition temperature or, upon curing, form an organopolysiloxane matrix that has a physical transition temperature, i.e., glass transition or melting transition, such that the radical polymerizable composition undergoes changes marked by softening or non-linear reduction in viscosity on reaching certain temperatures under conditions of use. Organopolysiloxane matrices are useful for phase change compositions such as those found to be useful in thermally conductive phase change thermal interface materials for electronic components. A suitable organopolysiloxane matrix includes an organofunctional silicone wax. The wax may be an uncross-linked organofunctional silicone wax, a cross-linked organofunctional silicone wax, or combinations thereof. Organofunctional silicone waxes including at least one free radical polymerizable group such as acrylate or methacrylate are useful as the radical polymerizable compounds to impart phase changes to the radical polymerizable composition.

Referring now to the organoborane-azole complex, this complex includes an azole having at least two nitrogen atoms wherein at least one of the nitrogen atoms is an $sp^3$ nitrogen atom and is substituted. Preferably, the $sp^3$ nitrogen atom is substituted with something other than a hydrogen atom, a primary amine, and/or a secondary amine. Typically, the complex is formed between an organoborane and a suitable azole that renders the organoborane-azole complex stable under conditions of use, typically under ambient conditions. It is to be understood that although the organoborane-azole complex is stable, some equilibration may occur. Typically, the organoborane-azole complex is capable of initiating polymerization or cross-linking of the radical polymerizable compound through introduction of an azole-reactive compound, described in greater detail below, and/or by heating. Although any organoborane may be used in the organoborane-azole complex, the organoborane typically includes tri-functional boranes which include the general structure:

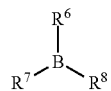

wherein each of $R^6$-$R^8$ independently has from 1 to 20 carbon atoms and wherein each of $R^6$-$R^8$ independently comprise one of a hydrogen, an aliphatic hydrocarbon group and an aromatic hydrocarbon group. Additionally, one or two of $R^6$-$R^8$ may be an alkoxy group. Typically, each of $R^6$-$R^8$ independently comprise one of an aliphatic hydrocarbon group an aromatic hydrocarbon group. Alternatively, each of $R^6$-$R^8$ may be independently selected from the group of a hydrogen atom, an alkyl group, a cycloalkyl group, a linear or branched alkyl group having from 1-12 carbon atoms, an arylalkyl group, an organosilane group, an organosiloxane bridged through an alkylene group to the boron atom, halogenated homologs thereof, and combinations thereof. The aliphatic and/or aromatic hydrocarbon groups may be linear, branched, and/or cyclic. Suitable examples of the organoborane include, but are not limited to, tri-methylborane, tri-ethylborane, tri-n-butylborane, tri-n-octylborane, tri-sec-butylborane, tri-dodecylborane, phenyldiethylborane, and combinations thereof. Most typically, the organoborane includes triethylborane and/or tri-n-butylborane. It is contemplated that the organoborane may have the general chemical formula $R_2B$—H and can be used in an inert and/or moisture free environment.

The organoborane-azole complex, which includes the aforementioned organoborane, typically has the following formula:

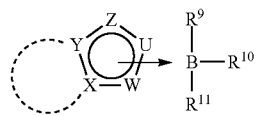

In this formula, B represents boron, the 5-membered cyclic group represents an azole having at least two nitrogen atoms wherein at least one nitrogen atom is an sp$^3$ nitrogen atom and is substituted, and the semi-circle of dashed lines represents a cyclic moiety. The cyclic moiety may have any ring size greater than 3 (including X and Y). Typically, each of R$^9$, R$^{10}$, and R$^{11}$ is independently selected from the group of a hydrogen atom, an alkyl group, a cycloalkyl group, a linear or branched alkyl group having from 1-12 carbon atoms, an arylalkyl group, an organosilane group, an organosiloxane group, e.g. an organosiloxane bridged through an alkylene group to the boron atom, halogenated homologs thereof, and combinations thereof. Alternatively, each of R$^9$, R$^{10}$, and R$^{11}$ may independently have from 1 to 20 carbon atoms and independently comprise one of a hydrogen, an aliphatic hydrocarbon group and an aromatic hydrocarbon group. One or two of R$^9$-R$^{11}$ may also be alkoxy groups. In one embodiment, R$^9$-R$^{11}$ are alkyl groups, organosilane groups, or organosiloxane groups bridged through an alkylene group to the boron atom. Each of U, W, X, Y, and Z may be independently selected from the group of carbon atoms and heteroatoms (i.e., atoms that are not carbon) with or without branched substituents, so long as the 5-membered cyclic group is an azole having at least two nitrogen atoms wherein at least one nitrogen atom is an sp$^3$ nitrogen atom and is substituted. Typically, heteroatoms include, but are not limited to, nitrogen atoms, oxygen atoms, sulfur atoms, phosphorus atoms, and/or boron atoms. Further, the cyclic moiety is typically selected from the group of aromatics, nonaromatics, carbocycles, and heterocycles. The cyclic moiety may have any ring size greater than 3 (including X and Y). Additional non-limiting examples of suitable R$^9$, R$^{10}$, and R$^{11}$ groups include alkyl groups, organosilane groups, and/or organosiloxane groups bridged through an alkylene group to the boron atom include, but are not limited to, R$^{iv}_3$SiCH$_2$CH$_2$CH$_2$—, (R$^{iv}$O)$_3$SiCH$_2$CH$_2$CH$_2$—, R$^{iv}_3$SiCH$_2$CH$_2$—, (R$^{iv}$O)$_3$SiCH$_2$CH$_2$—, (R$^{iv}$O)$_3$SiCH$_2$CH$_2$CH$_2$CH$_2$CH$_2$CH$_2$CH$_2$—, (R$^{iv}$O)$_3$SiCH$_2$CH$_2$CH$_2$OC(O)CH$_2$CH$_2$—, (R$^{iv}$O)$_3$SiCH$_2$CH$_2$CH$_2$OC(O)CH(CH$_3$)—, (R$^{iv}$O)$_3$SiCH$_2$CH$_2$CH$_2$OC(O)CH(CH$_3$)CH$_2$—, (R$^{iv}$O)$_3$SiCH$_2$CH$_2$CH$_2$OC(O)CH(CH$_3$)$_2$—, and CH$_2$=CH—(CH$_2$)$_x$—(Si(R$^{iv}$)$_2$—O)$_y$Si(R$^{iv}$)$_2$—(CH$_2$)$_x$—CH$_2$—CH$_2$—.

In these groups, x is typically a number of from zero to 20 and y is typically a number of from 1-1,000.

Some non-limiting examples of monovalent groups suitable for use as the R$^{iv}$ group include hydrogen atoms, halogen groups, alkyl groups such as methyl, ethyl, propyl, and butyl groups, alkenyl groups such as vinyl, allyl, and butenyl groups, acrylic groups such as acryloyloxypropyl and methacryloyloxypropyl groups, alkynyl groups such as ethynyl and propynyl groups, aromatic groups such as phenyl, tolyl, and xylyl groups, cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups, alkenyloxypoly(oxyalkyene) groups such as allyloxy(polyoxyethylene), allyloxypoly(oxypropylene), and allyloxy-poly(oxypropylene)-co-poly(oxyethylene) groups, alkyloxypoly(oxyalkyene) groups such as propyloxy(polyoxyethylene), propyloxypoly(oxypropylene), and propyloxy-poly(oxypropylene)-co-poly(oxyethylene) groups, halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups, alkoxy groups such as methoxy, ethoxy, n-propoxy, isopropoxy, n-butoxy, and ethylhexyloxy groups, epoxyalkyl groups such as 3-glycidoxypropyl, 2-(3,4,-epoxycyclohexyl)ethyl, and 5,6-epoxyhexyl groups, ester functional groups such as acetoxymethyl and benzoyloxypropyl groups, hydroxyl functional groups such as hydroxy and 2-hydroxyethyl groups, and combinations thereof. The organoborane may be selected from the group of triethylborane, ((2-diethylborylethyl)methylsiloxane)-dimethylsiloxane, tris(2-diethylborylethyl)-trismethylcyclictrisiloxane, bis(2-diethylborylethyl)-tetramethyldisiloxane, and combinations thereof.

Referring specifically to the azole first introduced above, azoles are aromatic five-membered nitrogen heterocyclic rings that include two double bonds and at least one other heteroatom (i.e., non-carbon atom) such as nitrogen, sulfur or oxygen. An azole is generically shown below:

In this structure, each of U, W, X, Y, and Z may be independently selected from the group of carbon atoms and heteroatoms (i.e., atoms that are not carbon) with or without branched substituents, so long as the 5 membered cyclic group is an azole having at least two nitrogen atoms wherein at least one nitrogen atom is an sp$^3$ nitrogen atom and is substituted. Typically, heteroatoms include, but are not limited to, nitrogen atoms, oxygen atoms, sulfur atoms, phosphorus atoms, or boron atoms.

As is known in the art, the terminology "sp$^3$" nitrogen atom refers to a nitrogen atom having a hybrid sp$^3$ orbital or, in other words, a nitrogen atom singly bonded to three other atoms. In this invention, any organoborane-azole complex may be used so long as the azole is as described above.

As is also known in the art, the terminology "substituted" means that at least one sp$^3$ nitrogen atom of the azole is bonded to a substituent, i.e., any type of organic substituent. In one embodiment, the azole has only one sp$^3$ nitrogen atom and it is substituted. In another embodiment, the azole has more than one sp$^3$ nitrogen atom but only one of the sp$^3$ nitrogen atoms is substituted. In a further embodiment, the azole has more than one sp$^3$ nitrogen atom and all of the sp$^3$ nitrogen atoms are substituted.

The at least one sp$^3$ nitrogen atom of the azole is substituted to reduce a nucleophilicity of the azole and further reduce a chance that the azole will react via Michael addition. Additionally, the substitution of the at least one sp$^3$ nitrogen atom reduces a chance that the azole will polymerize with borane and form a stable molecule that will not dissociate to initiate polymerization of the radical polymerizable compound. In addition, the substitution of the at least one sp$^3$ nitrogen atom maximizes the probability of obtaining a monomeric product.

As is known in the art, nucleophilicity is a measure of how readily a nucleophile, i.e., a compound that uses a lone pair of electrons to attack an electron-deficient atom, is able to attack an sp$^3$ atom, such as another nitrogen atom or a carbon atom. Typically, there is a general relationship between basicity and nucleophilicity with stronger bases making better nucleophiles. In the instant invention, and as described in detail below, the at least one sp$^3$ nitrogen atom of the azole is typically substituted with a substituent that is a weak base. As is also known in the art, Michael additions are nucleophilic addition reactions that depend on a nucleophilic attacking group. Thus, without intending to be bound by any particular theory, it is believed that by reducing a nucleophilicity of the azole, the chance that the azole will react via a Michael addition will also be reduced.

The azole of the instant invention may be selected from the group of substituted purine, substituted xanthine, substituted caffeine, substituted pyrazole (W=N, U=X=Y=Z=C), substituted imidazole (W=Y=N, U=X=Z=C), substituted 1,2,3-triazole (W=X=Y=N, U=Z=C), substituted 1,2,4-triazole (W=X=Z=N, U=Y=C), substituted tetrazole (W=X=Y=Z=N, U=C), substituted pentazole (U=W=X=Y=Z=N) and combinations thereof. The substituent(s) bonded to the at least one sp³ nitrogen atom of these azoles may be any organic moiety known in the art. Chemical structures of these azoles are provided below wherein R is the organic moiety described immediately above. In one embodiment, R is selected from the group of methyl, ethyl, butyl, and propyl moieties. In another embodiment, R is a butyl group. In a further embodiment, the azole is 1N-butylimidazole.

In various embodiments of the instant invention, the organoborane-azole complex, which includes the azole described above, is selected from the group of bis(2-diethylborylethyl)-tetramethyldisiloxane-1N-butylimidazole, tris(2-diethylborylethyl)-trismethylcyclictrisiloxane-1N-butylimidazole, ((2-diethylborylethyl)methylsiloxane)-dimethylsiloxane copolymer 1N-butylimidazole, triethylborane-1N-butylimidazole, triethylborane-1N-methylbenzimidazole, and combinations thereof. Chemical structures of each of the aforementioned organoborane-azole complexes are set forth below:

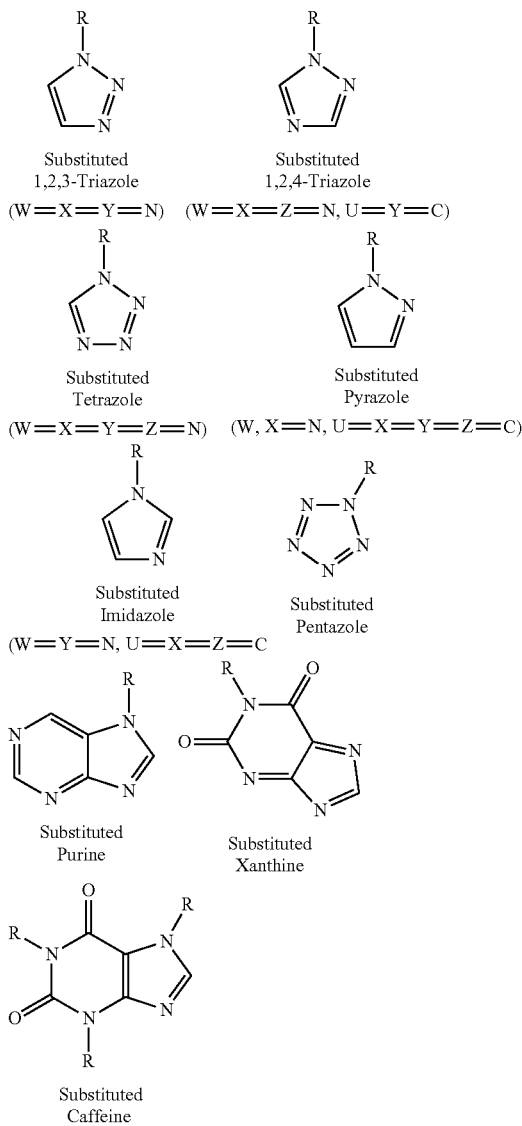

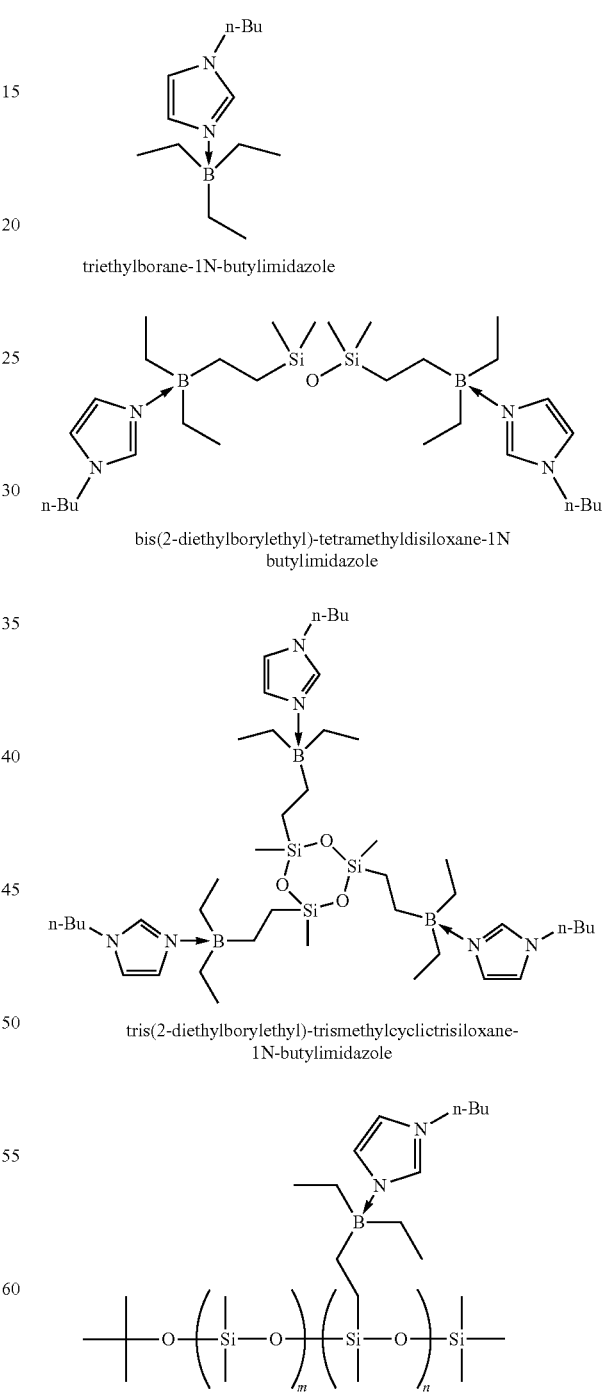

For storage stability of the polymerizable composition, it is preferred that the organic moiety (R) is free of primary and/or secondary amine functional groups.

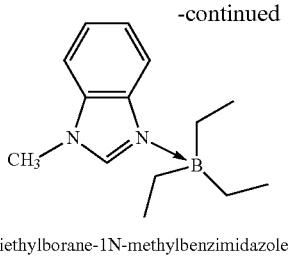

triethylborane-1N-methylbenzimidazole

The organoborane-azole complexes can be synthesized by hydroboration techniques reported in literature such as in Preparation of Functionalized Dialkylzincs via a Boron-Zinc Exchange. Reactivity and Catalytic Asymmetric Addition to Aldehydes, by Langer et al (J. Org. Chem. 1996, 61, 8229-8243) and in Tetraalkyldiboranes and 9-Borabicyclo-[3.3.1] Nonane Dimer, by Roster et al. (Inorganic Syntheses, 1974, 15, 141-149). One route of synthesis includes reaction of diethylborane in THF with a terminally alkenic organosilicon compound. Although it is known in the art that hydroboration with diethylborane shows comparable regioselectivity to disiamylborane or thexylborane, it is also known that such reactions generally can produce a mixture of products derived from the addition of boron to either the α penultimate position or the β terminal position of the carbon of the double bond. It is noted that the specific examples of structures illustrated herein include only β hydroboration products. However, it is to be understood that an α product, or a mixture of β and α products, may also be included in the organoborane-azole complex.

The organoborane-azole complex may be physically and/or chemically attached (bound) to a solid particle such as a phase support to control working times, as well as to stabilize liquid phase organoborane-azole complexes against separating in the composition during storage. Attachment can be accomplished by a number of known surface treatments either in-situ or a priori. Some surface treatment methods include pre-treating solid particles such as ground or precipitated silica, calcium carbonate, carbon black, carbon nanoparticles, silicon nanoparticles, barium sulfate, titanium dioxide, aluminum oxide, boron nitride, silver, gold, platinum, palladium, and alloys thereof, base metals such as nickel, aluminum, copper, and steel, and combinations thereof, with a reactive compound. Some examples of compounds that may be used for pretreatment include, but are not limited to, isocyanatopropyltriethoxysilane, isocyanatomethyltriethoxysilane, triethoxysilylundecanal, glycidoxypropyltrimethoxysilane, glycidoxymethyltrimethoxysilane, 3-(triethoxysilyl) propylsuccinic anhydride, 2-(4-chlorosulfonylphenyl) ethyltrimethoxysilane, and combinations thereof. The pretreatment may be followed by complexation with the organoborane, or by direct treatment of the solid particles using a preformed organoborane-azole complex that is reactive. If the solid particles include surface functional groups, additives such as surface treating agents or impurities that are inherently amine-reactive, may require appropriate pre-cautions to avoid premature decomplexation of the organoborane-azole complex being attached. Solid particles including azole-reactive substances can be purified or neutralized before attachment of the organoborane-azole complex. Alternatively, the attachment of the organoborane-azole complex may be performed in an oxygen free environment.

In various embodiments, the organoborane-azole complex is present in an amount of from 0.01 to 95, from 0.1 to 80, from 1 to 30, or from 1 to 2, parts by weight per 100 parts by weight of the composition. In other embodiments, the organoborane-azole complex is present in an amount of from 0.1 to 10, from 0.5 to 5, or from 1 to 10, parts by weight per 100 parts by weight of the composition. In one embodiment, the organoborane-azole complex is present in an amount of from 2 to 5 parts by weight per 100 parts by weight of the composition. The amounts of the organoborane-azole complex depend greatly upon a molecular weight and functionality of the organoborane-azole complex and the presence of other components such as fillers. Typically, a concentration of boron in the organoborane is between 10 and 100,000, more typically between 100 and 10,000, and most typically between 300 and 3,000, parts by weight per one million weight parts of radical polymerizable compound in the composition.

If the radical polymerizable compound is combined with the organoborane-azole complex, a stability time can be measured. Without intending to be bound by any particular theory, it is believed that, theoretically, the organoborane-azole complexes should remain intact and no reaction should occur upon this type of mixing. However, in practice, the organoborane-azole complex may partially decompose in an equilibrium and release the organoborane, which then acts as a radical initiator and initiates polymerization of the radical polymerizable compounds to a certain extent. Stability times, for various embodiments of the instant invention, are set forth in greater detail in the Examples below and demonstrate increased stability times relative to known alkylborane-amine complex initiators.

The composition may also include an azole-reactive compound, first introduced above. The azole-reactive compound may be any known in the art and may be delivered as a gas, liquid, or solid. In one embodiment, the organoborane-azole complex interacts with the azole-reactive compound to initiate polymerization or cross-linking of the composition. Typically this occurs when the azole-reactive compound is mixed with the organoborane-azole complex and exposed to an oxygenated environment at temperatures below a dissociation temperature of the organoborane-azole complex, including room temperature and below. Without intending to be limited by any particular theory, it is believed that the azole-reactive compound sequesters the azole and allows the organoborane to act as a free radical initiator and initiate polymerization of the radical polymerizable compound.

In one embodiment, the azole-reactive compound includes free radical polymerizable groups or other functional groups such as a hydrolyzable group, and can be monomeric, dimeric, oligomeric or polymeric. Examples of an azole-reactive compound that include free radical polymerizable groups are acrylic acid, methacrylic acid, 2-carboxyethyl acrylate, 2-carboxyethyl methacrylate, and combinations thereof. In all embodiments, the azole-reactive compound includes azole-reactive groups. The azole-reactive groups may be attached to an organic compound, an organosilicon compound, an organosilane, or an organopolysiloxane. It is contemplated that the azole-reactive groups may be derived from the organoborane-azole complex and/or any additives present.

Alternatively, the azole-reactive compound may be selected from the group of acids such as acetic acid, acrylic acid, methacrylic acid, and/or any of the strong acids known in the art, acid halides such as acid chlorides, inorganic acids such as HCl, sulfuric acid, alkyl or aryl sulfonic acid, transition metal cations, strong alkylating agents such as methyl iodide, and combinations thereof. In one embodiment, the azole-reactive compound is acetic acid. In another embodiment, the azole-reactive compound is selected from the group of oleic acid, undecylenic acid, polymethacrylic acid, stearic acid, citric acid, levulinic acid, and 2-carboxyethyl acrylate, and combinations thereof. In all embodiments, the azole-reactive compound may be present in the composition in any amount less than 100% of the composition. However, in various embodiments, the azole-reactive compound is present in an amount of from 0.1 to 95, from 0.1 to 90, from 1 to 50, from 2 to 5, or from 1 to 10, parts by weight per 100 parts by weight of the composition. The amount of the azole-reactive compound depends greatly upon a molecular weight and functionality of the azole-reactive compound and the presence of other components such as fillers. To increase polymerization or curing times, it is advantageous to use an amount of the azole-reactive compound that provides at least a stoichiometric equivalent, and preferably an excess, of azole reactive groups to azole or amine groups present in the composition.

If the radical polymerizable compound is combined with the organoborane-azole complex and the azole-reactive compound, an initiation time can be measured. Without intending to be bound by any particular theory, it is believed that, theoretically, the radical polymerizable compounds should react quickly with this type of mixing. Initiation times for various embodiments of the instant invention are set for in greater detail in the Examples below.

The composition may further include an additive. Although any additive known in the art may be used, the additive is typically selected from the group of an azole additive different from the azole of the organoborane-azole complex, a gas generating component, an adhesion promoter, an extending polymer, a softening polymer, a reinforcing polymer, a toughening polymer, a viscosity modifier, a volatility modifier, an extending filler, a reinforcing filler, a conductive filler, a spacer, a dye, a pigment, a co-monomer, a UV light absorber, a hindered amine light stabilizer, an aziridine stabilizer, a void reducing agent, a cure modifier, a free radical initiator, a diluent, a rheology modifier, an acid acceptor, an antioxidant, a heat stabilizer, a flame retardant, a silylating agent, a foam stabilizer, a surfactant, a wetting agent, a solvent, a plasticizer, a fluxing agent, a desiccant, and combinations thereof.

In one embodiment, the additive includes the gas generating component. In this embodiment, the gas generating component includes a silicon hydride, a compound including an active hydrogen atom such as water, an alcohol, and/or a carboxylic acid, and an organometallic compound. Typically, the additive includes the gas generating component when the composition is used to form a foam. Specifically, the gas generating compound generates hydrogen gas during curing to form the foam. The foam may be flexible or rigid, depending on the silicon hydride, active hydrogen, and the organometallic compound. A pore size distribution of the foam can be controlled by any known method of foam generation to achieve any desired property such as modulus, density, and permeability.

In another embodiment, the additive includes at least one of the extending, reinforcing, and conductive fillers. In this embodiment, the filler may be pre-treated with lubricants or other surface treating agents. If the pre-treating agents for the filler are azole-reactive, the filler may be used to deliver the azole-reactive compound. If the composition includes the additive, the additive is typically present in an amount of from 0.0001 to 95, more typically of from 0.001 to 90, and most typically of from 0.01 to 88, parts by weight per 100 parts by weight of the composition.

The composition may also include an encapsulating compound. The encapsulating compound may be disposed about the radical polymerizable compound, the organoborane-azole complex, and/or the azole-reactive compound. If so, the encapsulating agent may completely surround or may partially surround any part of the composition. Typically, the encapsulating compound surrounds one or more parts of the composition in a microphase.

In a further embodiment, the composition may be used in a multiple component adhesive. Combinations of the radical polymerizable compound, the organoborane-azole complex, and the azole-reactive compound may be used as parts of the multiple component adhesive. Typically, in the multiple component adhesive, if the azole-reactive compound and the organoborane-azole complex are stored together, the conditions are anaerobic, i.e., free of oxygen. Conversely, to achieve storage stability in the presence of oxygen, the organoborane-azole complex and the azole-reactive compound are typically physically and/or chemically isolated. For example, the composition may be rendered air stable by packaging the organoborane-azole complex separately from the azole-reactive compound. Alternatively, the organoborane-azole complex and the azole-reactive compound may be encapsulated and/or delivered in separate phases. This can be accomplished by storing one or both of the organoborane-azole complex and the azole-reactive compound in a solid form that prevents their intimate mixing, such as by encapsulation.

The instant invention also provides a cured composition formed from the composition described above. In all embodiments, the composition may be cured at any temperature and for any time. In one embodiment, the composition is typically cured at a temperature of from −100 to 300, more typically of from 0 to 100, and most typically of from 15 to 35° C. In another embodiment, the composition is cured for a time of at least 5 seconds, more typically of from 30 seconds to 24 hours, and most typically of from 15 seconds to 2 hours. For maximum benefit, the temperature typically ranges from 40 to 80, typically from 0 to 60, and more typically from 15 to 35° C.

The instant invention also provides a method of forming the composition. The method includes the step of combining the radical polymerizable compound and the organoborane-azole complex to form the composition. The method further includes the step of polymerizing the composition. In one embodiment, the method includes the step of heating the composition to a temperature of from 40° C. to 300° C., and more typically of about 70-170° C., to initiate polymerization of the radical polymerizable compound. In another embodiment, the step of polymerizing is further defined as exposing the radical polymerizable composition to a temperature of from 100 to 200° C. In another embodiment, the step of combining occurs at about 0° C. However, this step may occur at other temperatures, as selected by one of skill in the art. The method may also include the step of applying a vacuum to the radical polymerizable composition to reduce a content of volatile organic compounds in the composition.

The method may also include the step of providing the azole-reactive compound. In this embodiment, the step of combining may be further defined as combining the radical polymerizable compound, the organoborane-azole complex, and the azole-reactive compound to form the composition. Without intending to be bound by any particular theory, it is believed that, in this embodiment, combining the organoborane-azole complex and the azole-reactive compound in the presence of the radical polymerizable compound initiates polymerization of the radical polymerizable compound.

In one embodiment, the method further includes the step of hydroborating a vinyl terminated monomer with a borane. This can be used to form an organoborane or the organoborane-azole complex. As is known in the art, a hydroboration reaction is also known as a hydroboration-oxidation reaction. The step of hydroborating the vinyl terminated monomer may be carried out in a substantially inert atmosphere, i.e., in an atmosphere without oxygen. Of course, the hydroboration may follow any method known in the art.

In one embodiment, as the method may include the step of introducing the radical polymerizable compound into at least one of a first vessel and a second vessel. The method may further include the step of introducing the organoborane-azole complex into the first vessel. Still further, the method may include the step of introducing the azole-reactive compound into the second vessel. It is contemplated that the radical polymerizable compound and the organoborane-azole complex may be introduced into one or both the first and second vessels. Further, the method may include the step of combining the contents of the first and second vessels. Additionally, the first and/or second vessels may be substantially free of oxygen and moisture. Introduction and/or combination may be accomplished by any means known in the art. In one embodiment, combination is accomplished at a desired volume ratio in air in a bag or through a pressurized gun. While there is no restriction on a mixing ratio of contents of the first and second vessels, typically the mixing ratio of the contents of the first vessel to the contents of the second vessel is from 0.05:1 to 20:1, and more typically from 0.1:1 to 10:1.

The instant invention also provides a composite article. The composite article includes a substrate and the cured composition disposed on the substrate, i.e., the radical polymerizable composition described above that is cured and disposed on the substrate. The composite article may include any described in detail above including, but not limited to, rubbers, tapes, adhesives, protective coatings, films, encapsulants, etc.

The composite article may include a first substrate (or layer) and a second substrate formed from the composition and disposed on the first substrate. The second substrate does not have to be in direct contact with the first substrate, but may be in direct contact with the first substrate. Typically, the composite article is formed by bonding the second substrate to the first substrate. This may be accomplished by curing the composition and achieving sufficient adherence such that the second substrate and the first substrate are bonded together securely to form the composite article. In another embodiment, the composite article is made by disposing the composition onto the first substrate at a temperature less than the boiling point of water (100° C.), and then concurrently curing the composition to form the second substrate. This obviates the need to pre-dry the first and/or second substrate.

The composite article may also include a third substrate disposed on the second substrate. The third substrate does not have to be in direct contact with the second substrate or the first substrate, but may be in direct contact with the second substrate and/or the first substrate. Typically, the third substrate is disposed on the second substrate and sandwiches the second substrate between the first substrate and the third substrate.

In an additional embodiment, at least one of the first and third substrates is selected from the group of an organic material, a thermoplastic material, a thermoset material, a metallic material, a ceramic material, an inorganic material, and combinations thereof. In this embodiment, at least one of the first and third substrates is also typically selected from the group of unmodified syndiotactic polystyrene (PS), polytetrafluoroethylene (PTFE), polyethylene (PE), polypropylene (PP), polybutylene terephthalate, polyethylene terephthalate (PET) and combinations thereof.

As set forth above, the composition may be cured at any temperature and for any time. Typically, when at least one of the first and third substrates includes glass reinforced polybutylene terephthalate (PBT), the upper temperature for curing the composition is less than 80° C. For maximum benefit, the temperature typically ranges from 40 to 80, typically from 0 to 60, and more typically from 15 to 35, ° C. The composition may be applied to the first and/or third substrates by meter mixing, extruding, and/or using robotic or manual application.

The instant invention also provides a method of forming the composite article. The method may include the steps of applying the radical polymerizable composition to the substrate and curing the radical polymerizable composition to form the cured composition.

The following examples are set forth in order to illustrate the invention in more detail and are not intended to limit the invention in any way.

EXAMPLES

A series of 24 radical polymerizable compositions (Compositions 1-24) are formed according to the present invention. A series of Organoborane-Azole Complexes 1-4 are also formed. Additionally, a series of 12 comparative compositions (Comparative Compositions 1-12) are also formed. Each of the Compositions 1-24 and the Comparative Compositions 1-12 are evaluated for Initiation and Stability Times. It is to be appreciated that the Initiation and Stability Times depend, at least in part, on the nature of the radical polymerizable compound.

More specifically, to evaluate the Stability Times, individual samples of the Organoborane-Azole Complexes 1-4 are mixed with individual samples of a series of Radical Polymerizable Compounds 1-6. Notably, there is no amount of an Azole-Reactive Compound added when evaluating Stability Times. After mixing the Organoborane-Azole Complexes and the Radical Polymerizable Compounds, the Stability Times are measured. The Stability Times are set forth in Table 1 below for each of the Compositions 1-24 and the Comparative Compositions 1-12.

To evaluate Initiation Times, individual samples of the Organoborane-Azole Complexes 1-4 are mixed with individual samples of the Radical Polymerizable Compounds 1-6 and an Azole-Reactive Compound (i.e., glacial acetic acid). After mixing, the Initiation Times are measured. Relative to the Comparative Compositions 1-12, the Azole-Reactive Compound reacts with organoborane-amine complexes of the prior art (Organoborane-Amine Complexes 1 and 2) to release the organoborane and begin the reaction. The Initiation Times are set forth in Table 1 below for each of the Compositions 1-24 and the Comparative Compositions 1-12.

Synthesis of Diethylborane

A reaction mixture of diethylborane is prepared by mixing triethylborane (3.0 g, 31 mmol) and a borane-THF solution (1.14 g, 15 mmol) at 0° C. under argon. The reaction mixture is stirred for 45 min at 0° C. Diethylborane prepared under these conditions is used without further purification.

Generic Procedure for the Synthesis of Organoborane-Azole Complexes 1-4

The Organoborane-Azole Complexes 1-4 are synthesized by hydroboration of a terminally vinyl containing monomer, with the diethylborane formed above, in anhydrous THF under argon. A neat alkene (1 mmolar equivalent) is added to a solution of diethylborane in THF at 0° C. under argon to form a reaction mixture. The reaction mixture is stirred overnight. The content of any volatile organic compounds in the reaction mixture is reduced under vacuum. Subsequently, anhydrous THF (10 mL) is added to the reaction mixture. The reaction mixture is then cooled to 0° C. in an ice bath and an appropriate azole compound (1.0 mmolar equivalent per millimole of vinyl group) is added dropwise under argon. The ice bath is removed and the stirring is continued for about 1 hour at room temperature. A content of solvent and volatiles in the reaction mixture is reduced in vacuo to form air stable Organoborane-Azole Complexes 1-4 whose structure is characterized by $^1$H NMR, $^{13}$C NMR, $^{11}$B NMR, and $^{29}$Si NMR (if applicable).

Synthesis of Organoborane-Azole Complex 1—bis (2-diethylborylethyl)-tetramethyldisiloxane-1N-butylimidazole Complex An amount of 1,3-divinyltetramethyldisiloxane (10 mmol, 2.3 mL) is added dropwise to a solution of diethylborane in THF (22.5 mmol, 15 mL) at 0° C. under argon to form a reaction mixture. The reaction mixture is stirred overnight. A content of volatile organic compounds in the reaction mixture is reduced under vacuum and anhydrous THF (10 mL) is added. The reaction mixture is then cooled to 0° C. in an ice bath and 1N-butylimidazole (20 mmol, 2.6 mL) is added dropwise under argon. The ice bath is removed and stirring is continued for 1 hour at room temperature. A content of solvent and volatiles in the reaction mixture is reduced in vacuo to give an air-stable liquid. The yield is about 5.26 g (91%).

Synthesis of Organoborane-Azole Complex 2—tris (2-diethylborylethyl)-trismethylcyclictrisiloxane-1N-butylimidazole Complex An amount of trivinyltrimethylcyclictrisiloxane (7 mmol, 1.9 mL) is added dropwise to a solution of diethylborane in THF (22.5 mmol, 15 mL) at 0° C. under argon to form a reaction mixture. The reaction mixture is stirred overnight. Subsequently, a content of volatile organic compounds in the reaction mixture is reduced under vacuum and anhydrous THF (10 mL) is added. The reaction mixture is then cooled to 0° C. in an ice bath and 1N-butylimidazole (21 mmol, 2.9 mL) is added dropwise under argon. The ice bath is removed and the stirring is continued for 1 hour at room temperature. A content of solvent and volatiles in the reaction mixture is reduced in vacuo to give a clear, viscous, and air-stable liquid. The yield is about 5.80 g (98%).

Synthesis of Organoborane-Azole Complex 3-triethylborane-1N-butylimidazole Complex (TEB-BI)

An amount of 1N-butylimidazole (20 mmol, 2.6 mL) is added dropwise to triethylborane (1.0 M in THF, 20 mL) with stirring at 0° C. in an ice bath, under argon, to form a reaction mixture. The ice bath is removed and a clear solution resulting from the reaction is allowed to warm to room temperature. A content of volatile organic compounds in the reaction mixture is reduced under vacuum to give a yellow oil. The yield is about 4.40 g (100%).

Synthesis of Organoborane-Azole Complex 4—triethylborane-1N-methylbenzimidazole Complex An amount of triethylborane (34.5 mmol, 34.5 mL) in THF is added dropwise to triethylborane 1N-methylbenzimidazole (37.8 mmol, 5.0 g) in anhydrous THF (15 mL) with stirring at 0° C. in an ice bath, under argon, to form a reaction mixture. The ice bath is removed after addition of triethylborane, and the solution is allowed to warm to room temperature. The stirring is discontinued after 5 hours under argon. A content of volatiles in the reaction mixture is reduced under vacuum to give a colorless oil, which crystallizes upon standing. The yield is about 7.18 g (86%).

Example 1

Formation of Compositions 1-6

4.0 parts of Organoborane-Azole Complex 1 are added to 94.5 parts of various Radical Polymerizable Compounds (See Table 1) to form a series of mixtures. Samples of these mixtures are evaluated to determine Stability Times according to the procedure described above.

Other samples of the mixtures are then thoroughly mixed prior to adding 1.5 parts of an Azole-Reactive Compound (glacial acetic acid) to each. The mixtures are then mixed in air and a time to cure is reported as Initiation Time according to the procedure described above. After curing, the Compositions 1-6 are opaque in color.

Example 2

Formation of Compositions 7-12

3.8 parts of Organoborane-Azole Complex 2 are added to 94.6 parts of various Radical Polymerizable Compounds (See Table 1) to form a series of mixtures. Samples of these mixtures are evaluated to determine Stability Times according to the procedure described above.

Other samples of the mixtures are then thoroughly mixed prior to adding 1.6 parts of an Azole-Reactive Compound (glacial acetic acid) to each. The mixtures are then mixed in air and a time to cure is reported as Initiation Time according to the procedure described above. After curing, the Compositions 7-12 are opaque in color.

Example 3

Formation of Compositions 13-18

3.0 parts of Organoborane-Azole Complex 3 are added to 95.5 parts of various Radical Polymerizable Compounds (See Table 1) to form a series of mixtures. Samples of these mixtures are evaluated to determine Stability Times according to the procedure described above.

Other samples of the mixtures are thoroughly mixed prior to adding 1.5 parts of an Azole-Reactive Compound (glacial acetic acid) to each. The mixtures are then mixed in air and a time to cure is reported as Initiation Time according to the procedure described above. After curing, the Compositions 13-18 are opaque in color.

Example 4

Formation of Compositions 19-24

3.8 parts of Organoborane-Azole Complex 4 are added to 94.6 parts of various Radical Polymerizable Compounds (See Table 1) to form a series of mixtures. Samples of these mixtures are evaluated to determine Stability Times according to the procedure described above.

Other samples of the mixtures are thoroughly mixed prior to adding 1.6 parts of an Azole-Reactive Compound (glacial acetic acid) to each. The mixtures are then mixed in air and a time to cure is reported as Initiation Time according to the procedure described above. After curing, the Compositions 19-24 are opaque in color.

Comparative Example 1

Formation of Comparative Compositions 1-6

2.5 parts of an Organoborane-Amine Complex 1 (triethylborane-propylenediamine mono complex) are added to 94.1 parts of various Radical Polymerizable Compounds (See Table 1) to form a series of mixtures. Samples of these mixtures are evaluated to determine Stability Times according to the procedure described above.

Other samples of the mixtures are thoroughly mixed prior to adding 3.4 parts of an Azole-Reactive Compound (glacial acetic acid) to each. The mixtures are then mixed in air and a time to cure is reported as Initiation Time according to the procedure described above. After curing, the Comparative Compositions 1-6 are opaque in color.

Comparative Example 2

Formation of Comparative Compositions 7-12

3.8 parts of an Organoborane-Amine Complex 2 (tri-n-butyl borane-3-methoxypropylamine complexed with 1.3 molar equivalents of 3-methoxypropyl amine) are added to 92.8 parts of various Radical Polymerizable Compounds (See Table 1) to form a series of mixtures. Samples of these mixtures are evaluated to determine Stability Times according to the procedure described above.

Other samples of the mixtures are thoroughly mixed prior to adding 3.4 parts of an Azole-Reactive Compound (glacial acetic acid) to each. The mixtures are then mixed in air and a time to cure is reported as Initiation Time according to the procedure described above. After curing, the Comparative Compositions 7-12 are opaque in color.

TABLE 1

|  | Composition 1 | Composition 2 | Composition 3 | Composition 4 |
|---|---|---|---|---|
| Radical Polymerizable Compound 1 | 94.5 | — | — | — |
| Radical Polymerizable Compound 2 | — | 94.5 | — | — |
| Radical Polymerizable Compound 3 | — | — | 94.5 | — |
| Radical Polymerizable Compound 4 | — | — | — | 94.5 |
| Radical Polymerizable Compound 5 | — | — | — | — |
| Radical Polymerizable Compound 6 | — | — | — | — |
| Organoborane-Azole Complex 1 | 4 | 4 | 4 | 4 |
| Organoborane-Azole Complex 2 | — | — | — | — |
| Organoborane-Azole Complex 3 | — | — | — | — |
| Organoborane-Azole Complex 4 | — | — | — | — |
| Organoborane-Amine Complex 1 | — | — | — | — |
| Organoborane-Amine Complex 2 | — | — | — | — |
| Azole-Reactive Compound | 1.5 | 1.5 | 1.5 | 1.5 |
| Initiation Time | <3 min | <3 min | <3 min | <3 min |
| Stability Time | 15 min | <3 min | >7 days | 15 min |

|  | Composition 5 | Composition 6 | Composition 7 | Composition 8 |
|---|---|---|---|---|
| Radical Polymerizable Compound 1 | — | — | 94.6 | — |
| Radical Polymerizable Compound 2 | — | — | — | 94.6 |
| Radical Polymerizable Compound 3 | — | — | — | — |
| Radical Polymerizable Compound 4 | — | — | — | — |

TABLE 1-continued

|  | | | | |
|---|---|---|---|---|
| Radical Polymerizable Compound 5 | 94.5 | — | — | — |
| Radical Polymerizable Compound 6 | — | 94.5 | — | — |
| Organoborane-Azole Complex 1 | 4 | 4 | — | — |
| Organoborane-Azole Complex 2 | — | — | 3.8 | 3.8 |
| Organoborane-Azole Complex 3 | — | — | — | — |
| Organoborane-Azole Complex 4 | — | — | — | — |
| Organoborane-Amine Complex 1 | — | — | — | — |
| Organoborane-Amine Complex 2 | — | — | — | — |
| Azole-Reactive Compound | 1.5 | 1.5 | 1.6 | 1.6 |
| Initiation Time | <3 min | 15 min | <3 min | <3 min |
| Stability Time | <3 min | >7 days | >7 days | 5 min |

|  | Composition 9 | Composition 10 | Composition 11 | Composition 12 |
|---|---|---|---|---|
| Radical Polymerizable Compound 1 | — | — | — | — |
| Radical Polymerizable Compound 2 | — | — | — | — |
| Radical Polymerizable Compound 3 | 94.6 | — | — | — |
| Radical Polymerizable Compound 4 | — | 94.6 | — | — |
| Radical Polymerizable Compound 5 | — | — | 94.6 | — |
| Radical Polymerizable Compound 6 | — | — | — | 94.6 |
| Organoborane-Azole Complex 1 | — | — | — | — |
| Organoborane-Azole Complex 2 | 3.8 | 3.8 | 3.8 | 3.8 |
| Organoborane-Azole Complex 3 | — | — | — | — |
| Organoborane-Azole Complex 4 | — | — | — | — |
| Organoborane-Amine Complex 1 | — | — | — | — |
| Organoborane-Amine Complex 2 | — | — | — | — |
| Azole-Reactive Compound | 1.6 | 1.6 | 1.6 | 1.6 |
| Initiation Time | <3 min | <3 min | <3 min | <3 min |
| Stability Time | >7 days | >7 days | 5 min | >7 days |

|  | Composition 13 | Composition 14 | Composition 15 | Composition 16 |
|---|---|---|---|---|
| Radical Polymerizable Compound 1 | 95.5 | — | — | — |
| Radical Polymerizable Compound 2 | — | 95.5 | — | — |
| Radical Polymerizable Compound 3 | — | — | 95.5 | — |
| Radical Polymerizable Compound 4 | — | — | — | 95.5 |
| Radical Polymerizable Compound 5 | — | — | — | — |

TABLE 1-continued

|  | | | | |
|---|---|---|---|---|
| Radical Polymerizable Compound 6 | — | — | — | — |
| Organoborane-Azole Complex 1 | — | — | — | — |
| Organoborane-Azole Complex 2 | — | — | — | — |
| Organoborane-Azole Complex 3 | 3 | 3 | 3 | 3 |
| Organoborane-Azole Complex 4 | — | — | — | — |
| Organoborane-Amine Complex 1 | — | — | — | — |
| Organoborane-Amine Complex 2 | — | — | — | — |
| Azole-Reactive Compound | 1.5 | 1.5 | 1.5 | 1.5 |
| Initiation Time | <3 min | 24 hrs | <3 min | 4 min |
| Stability Time | >7 days | >7 days | >7 days | >7 days |

|  | Composition 17 | Composition 18 | Composition 19 | Composition 20 |
|---|---|---|---|---|
| Radical Polymerizable Compound 1 | — | — | 94.6 | — |
| Radical Polymerizable Compound 2 | — | — | — | 94.6 |
| Radical Polymerizable Compound 3 | — | — | — | — |
| Radical Polymerizable Compound 4 | — | — | — | — |
| Radical Polymerizable Compound 5 | 95.5 | — | — | — |
| Radical Polymerizable Compound 6 | — | 95.5 | — | — |
| Organoborane-Azole Complex 1 | — | — | — | — |
| Organoborane-Azole Complex 2 | — | — | — | — |
| Organoborane-Azole Complex 3 | 3 | 3 | — | — |
| Organoborane-Azole Complex 4 | — | — | 3.8 | 3.8 |
| Organoborane-Amine Complex 1 | — | — | — | — |
| Organoborane-Amine Complex 2 | — | — | — | — |
| Azole-Reactive Compound | 1.5 | 1.5 | 1.6 | 1.6 |
| Initiation Time | <3 min | 48 hrs | <3 min | <3 min |
| Stability Time | >7 days* | >7 days | N/A | N/A |

|  | Composition 21 | Composition 22 | Composition 23 | Composition 24 |
|---|---|---|---|---|
| Radical Polymerizable Compound 1 | — | — | — | — |
| Radical Polymerizable Compound 2 | — | — | — | — |
| Radical Polymerizable Compound 3 | 94.6 | — | — | — |
| Radical Polymerizable Compound 4 | — | 94.6 | — | — |
| Radical Polymerizable Compound 5 | — | — | 94.6 | — |
| Radical Polymerizable Compound 6 | — | — | — | 94.6 |

TABLE 1-continued

| | | | | |
|---|---|---|---|---|
| Organoborane-Azole Complex 1 | — | — | — | — |
| Organoborane-Azole Complex 2 | — | — | — | — |
| Organoborane-Azole Complex 3 | — | — | — | — |
| Organoborane-Azole Complex 4 | 3.8 | 3.8 | 3.8 | 3.8 |
| Organoborane-Amine Complex 1 | — | — | — | — |
| Organoborane-Amine Complex 2 | — | — | — | — |
| Azole-Reactive Compound | 1.6 | 1.6 | 1.6 | 1.6 |
| Initiation Time | <3 min | <3 min | <3 min | 5 min |
| Stability Time | N/A | N/A | N/A | N/A |

| | Comparative Composition 1 | Comparative Composition 2 | Comparative Composition 3 | Comparative Composition 4 |
|---|---|---|---|---|
| Radical Polymerizable Compound 1 | 94.1 | — | — | — |
| Radical Polymerizable Compound 2 | — | 94.1 | — | — |
| Radical Polymerizable Compound 3 | — | — | 94.1 | — |
| Radical Polymerizable Compound 4 | — | — | — | 94.1 |
| Radical Polymerizable Compound 5 | — | — | — | — |
| Radical Polymerizable Compound 6 | — | — | — | — |
| Organoborane-Azole Complex 1 | — | — | — | — |
| Organoborane-Azole Complex 2 | — | — | — | — |
| Organoborane-Azole Complex 3 | — | — | — | — |
| Organoborane-Azole Complex 4 | — | — | — | — |
| Organoborane-Amine Complex 1 | 2.5 | 2.5 | 2.5 | 2.5 |
| Organoborane-Amine Complex 2 | — | — | — | — |
| Azole-Reactive Compound | 3.4 | 3.4 | 3.4 | 3.4 |
| Initiation Time | <3 min | <3 min | <3 min | <3 min |
| Stability Time | 24 hours | 24 hours | 4 days | 24 hours |

| | Comparative Composition 5 | Comparative Composition 6 | Comparative Composition 7 | Comparative Composition 8 |
|---|---|---|---|---|
| Radical Polymerizable Compound 1 | — | — | 92.8 | — |
| Radical Polymerizable Compound 2 | — | — | — | 92.8 |
| Radical Polymerizable Compound 3 | — | — | — | — |
| Radical Polymerizable Compound 4 | — | — | — | — |
| Radical Polymerizable Compound 5 | 94.1 | — | — | — |
| Radical Polymerizable Compound 6 | — | 94.1 | — | — |
| Organoborane-Azole Complex 1 | — | — | — | — |

TABLE 1-continued

|  |  |  |  |  |
|---|---|---|---|---|
| Organoborane-Azole Complex 2 | — | — | — | — |
| Organoborane-Azole Complex 3 | — | — | — | — |
| Organoborane-Azole Complex 4 | — | — | — | — |
| Organoborane-Amine Complex 1 | 2.5 | 2.5 | — | — |
| Organoborane-Amine Complex 2 | — | — | 3.8 | 3.8 |
| Azole-Reactive Compound | 3.4 | 3.4 | 3.4 | 3.4 |
| Initiation Time | <3 min | <3 min | <3 min | <3 min |
| Stability Time | 24 hours | 24 hours | 24 hours | >7 days |

|  | Comparative Composition 9 | Comparative Composition 10 | Comparative Composition 11 | Comparative Composition 12 |
|---|---|---|---|---|
| Radical Polymerizable Compound 1 | — | — | — | — |
| Radical Polymerizable Compound 2 | — | — | — | — |
| Radical Polymerizable Compound 3 | 92.8 | — | — | — |
| Radical Polymerizable Compound 4 | — | 92.8 | — | — |
| Radical Polymerizable Compound 5 | — | — | 92.8 | — |
| Radical Polymerizable Compound 6 | — | — | — | 92.8 |
| Organoborane-Azole Complex 1 | — | — | — | — |
| Organoborane-Azole Complex 2 | — | — | — | — |
| Organoborane-Azole Complex 3 | — | — | — | — |
| Organoborane-Azole Complex 4 | — | — | — | — |
| Organoborane-Amine Complex 1 | — | — | — | — |
| Organoborane-Amine Complex 2 | 3.8 | 3.8 | 3.8 | 3.8 |
| Azole-Reactive Compound | 3.4 | 3.4 | 3.4 | 3.4 |
| Initiation Time | <3 min | <3 min | <3 min | <3 min |
| Stability Time | >7 days | 24 hours | 24 hours | >7 days |

*<5% gel was observed after 7 days

Radical Polymerizable Compound 1 is 1,4-butanediol diacrylate.

Radical Polymerizable Compound 2 is bis(methacryloxypropyl)tetramethyldisiloxane.

Radical Polymerizable Compound 3 is α,ω-methacryloxypropyldimethylsilyl-terminated polydimethyl siloxane having a number average molecular weight of 8,200 g/mol.

Radical Polymerizable Compound 4 is 1,3-butyleneglycol dimethacrylate.

Radical Polymerizable Compound 5 is trimethylolpropane triacrylate.

Radical Polymerizable Compound 6 is 1,3-butyleneglycol dimethacrylate from a different commercial source than Radical Polymerizable Compound 4.

Organoborane-Azole Complexes 1-4 are as described above.

Organoborane-Amine Complexes 1 and 2 are as described above.

Azole-Reactive Compound is glacial acetic acid, as described above.

As set forth in Table 1, the Compositions 1-24 generally exhibit excellent Initiation and Stability Times, as compared to the Comparative Compositions. More specifically, the Compositions 1-24 generally have increased stability times as compared to the Comparative Compositions. This corresponds to the Organoborane-Azole Complexes remaining intact and resisting formation of radicals. Additionally, decomposition of the Organoborane-Azole Complexes in the presence of the Azole-Reactive Compound is believed to sequester the azole and release free borane, which forms radicals that begin the reaction. Additionally, the Organoborane-Azole Complexes 1-4 are generally more chemically stable in monomer solutions such as acrylate functional monomer solutions and do not as readily react with acrylates or reaction impurities at room temperature. The initiators used in the Comparative Compositions include relatively large excesses of primary amines (30 mol % or higher) to the organoborane complexes. In the Compositions of the instant invention, the azoles are typically used in modest stoichiometric excesses such as 5 to 10 mol % to achieve similar or longer stability times. The stability reduces a chance that premature polymerization of the compositions will occur thereby increasing shelf life. This stability also allows for more efficient, predictable, and reproducible polymerization reactions to be used to form cured compositions and form composite articles.

The Organoborane-Azole Complexes 1-4 and the Organoborane-Amine Complexes 1 and 2 are also evaluated to determine decomposition onset temperatures. More specifically, 3-5 mg samples of each of the Organoborane-Azole Complexes 1-4 and the Organoborane-Amine Complexes 1 and 2 are evaluated using dynamic scanning calorimetry (DSC) with a DuPont 910 DSC equipped with Thermal Analyst 2000 software by TA Instruments. The DSC is performed in air (flow rate=25 mL/minute) at a heating rate of 10° C./min from room temperature to 350° C. The results of the DSC are set forth in Table 2 below.

TABLE 2

|  | DSC Peak onset T in air (° C.) |
| --- | --- |
| Organoborane-Azole Complex 1 | 46.1 |
| Organoborane-Azole Complex 2 | 61.0 |
| Organoborane-Azole Complex 3 | 80.3 |
| Organoborane-Azole Complex 4 | 56.2 |
| Organoborane-Amine Complex 1 | 72.5 |
| Organoborane-Amine Complex 2 | 49.5 |

As set forth in Table 2, the Organoborane-Azole Complexes 1-4 of this invention are either similar in stability or more stable in air compared to the comparative Organoborane-Amine Complexes 1 and 2. This allows the organoborane-azoles of this invention to be successfully used in a wide variety of applications and especially with acrylic monomers. Additionally, even when the organoborane-azole does not include a primary amine it remains highly stable in air which is unexpected and also provides enhanced stability in monomers relative to amine-functional complexes.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A radical polymerizable composition comprising:
a radical polymerizable compound; and
an organoborane-azole complex selected from the group of bis(2-diethylborylethyl)-tetramethyldisiloxane-1N-butylimidazole, tris(2-diethylborylethyl)-trismethylcyclictrisiloxane-1N-butylimidazole, ((2-diethylborylethyl)methylsiloxane)-dimethylsiloxane copolymer 1N-butylimidazole, triethylborane-1N-butylimidazole, triethylborane-1N-methylbenzimidazole, and combinations thereof.

2. A composition as set forth in claim 1 further comprising an azole-reactive compound.

3. A composition as set forth in claim 2 wherein said azole-reactive compound is present in an amount of from 1 to 10 parts by weight per 100 parts by weight of the composition.

4. A composition as set forth in claim 1 which is substantially free of radical polymerizable compounds that do not include one or more silicon atoms.

5. A composition as set forth in claim 1 wherein said radical polymerizable compound is selected from the group of an organosilane, an organopolysiloxane, and combinations thereof.

6. A composition as set forth in claim 1 wherein said radical polymerizable compound comprises an organosilane having the general structure:

wherein n is an integer of less than or equal to 4; and
wherein at least one of R and R' independently comprises a free radical polymerizable group.

7. A composition as set forth in claim 1 wherein said radical polymerizable compound comprises methacryloxypropyldiethylsiloxy-terminated polydimethylsiloxane.

8. A composition as set forth in claim 1 which is substantially free of radical polymerizable compounds that include one or more silicon atoms.

9. A composition as set forth claim 1 wherein said radical polymerizable compound is selected from the group of acrylates, alkenoates, carbonates, phthalates, acetates, itaconates, and combinations thereof.

10. A composition as set forth in claim 1 wherein said radical polymerizable compound is selected from the group of alkylene glycol dialkylacrylate, alkylene glycol diacrylate, and combinations thereof.

11. A composition as set forth in claim 1 wherein said radical polymerizable compound is present in an amount of from 90 to 97 parts by weight per 100 parts by weight of said composition.

12. A composition as set forth in claim 1 wherein said organoborane-azole complex is present in an amount of from 1 to 10 parts by weight per 100 parts by weight of the composition.

13. A composition as set forth in claim 1 wherein said radical polymerizable compound comprises a silicon compound and an organic compound.

14. A method of forming a radical polymerizable composition comprising a radical polymerizable compound and an organoborane-azole complex selected from the group of bis (2-diethylborylethyl)-tetramethyldisiloxane-1N-butylimidazole, tris(2-diethylborylethyl)-trismethylcyclictrisiloxane-1N-butylimidazole, ((2-diethylborylethyl)methylsiloxane)-dimethylsiloxane copolymer 1N-butylimidazole, triethylborane-1N-butylimidazole, triethylborane-1N-methylbenzimidazole, and combinations thereof, said method comprising the steps of:
combining the radical polymerizable compound and the organoborane-azole complex to form the radical polymerizable composition; and
polymerizing the radical polymerizable composition.

15. A method as set forth in claim 14 further comprising the step of providing an azole-reactive compound and wherein the step of combining is further defined as combining the radical polymerizable compound, the organoborane-azole complex, and the azole-reactive compound to form the radical polymerizable composition.

16. A method as set forth in claim 14 further comprising the step of hydroborating a vinyl terminated monomer with a borane.

17. A method as set forth in claim 16 wherein said step of hydroborating is carried out in a substantially inert atmosphere.

18. A method as set forth in claim 14 wherein the step of polymerizing is further defined as exposing the radical polymerizable composition to a temperature of from 100 to 200° C.

19. A method as set forth in claim 14 wherein said step of combining occurs at about 0° C.

20. A method as set forth in claim 14 further comprising the step of applying a vacuum to the radical polymerizable composition to reduce a content of volatile organic compounds.

21. A method of forming a composite article comprising a substrate and a cured composition disposed on the substrate and formed from polymerization of a radical polymerizable composition, said method comprising the steps of:
applying the radical polymerizable composition to the substrate; and
curing the radical polymerizable composition to form the cured composition,
wherein the radical polymerizable composition comprises a radical polymerizable compound and an organoborane-azole complex selected from the group of bis(2-diethylborylethyl)-tetramethyldisiloxane-1N-butylimidazole, tris(2-diethylborylethyl)-trismethylcyclictrisiloxane-1N-butylimidazole, ((2-diethylborylethyl)methylsiloxane)-dimethylsiloxane copolymer 1N-butylimidazole, triethylborane-1N-butylimidazole, triethylborane-1N-methylbenzimidazole, and combinations thereof.

* * * * *